United States Patent [19]
Land et al.

[11] 3,958,261
[45] May 18, 1976

[54] REFLEX CAMERA AND VIEWING DEVICE AND ATTACHMENT THEREFOR

[75] Inventors: Edwin H. Land, Cambridge; Philip G. Baker, Peabody, both of Mass.

[73] Assignee: Polaroid Corporation, Cambridge, Mass.

[22] Filed: Apr. 4, 1974

[21] Appl. No.: 457,855

[52] U.S. Cl. ................................ 354/295; 354/225
[51] Int. Cl.² ......................................... G03B 13/18
[58] Field of Search .......... 354/155, 219, 220, 221, 354/222, 223, 224, 225, 158, 295

[56]     References Cited
         UNITED STATES PATENTS

| | | | |
|---|---|---|---|
| 1,066,848 | 7/1913 | Ruttan et al. | 354/224 |
| 1,331,363 | 2/1920 | Patton | 354/224 |
| 1,684,531 | 9/1928 | Bornmann | 354/223 |
| 2,187,057 | 1/1940 | Sauer | 354/225 |
| 2,300,245 | 10/1942 | Bell | 354/222 X |
| 3,583,300 | 6/1971 | Johnson et al. | 354/219 |
| 3,709,131 | 1/1973 | Plummer | 354/158 |
| 3,738,238 | 6/1973 | Hager | 354/219 |

OTHER PUBLICATIONS

Rothschild "How To See With Glasses", Popular Photography, Nov. 1969, Vol. 65, No. 5, pp. 83–84.

*Primary Examiner*—L. T. Hix
*Assistant Examiner*—E. M. O'Connor
*Attorney, Agent, or Firm*—Michael Bard; John W. Ericson

[57]             ABSTRACT

A compact folding camera and viewing device and an apertured flexible mask removably attachable to the viewing device over the eye lens thereof. The mask folds flat within the viewing device in a storage position and when the viewing device is erected to a viewing position the aperture is positioned proximate the exit pupil of the viewing device and is oriented to cause a user to place his eye proximate the exit pupil and sight along the optical axis of the viewing device. The mask is provided with an antireflective face and the aperture is larger than the exit pupil so as not to restrict the field of view through the viewing device.

11 Claims, 5 Drawing Figures

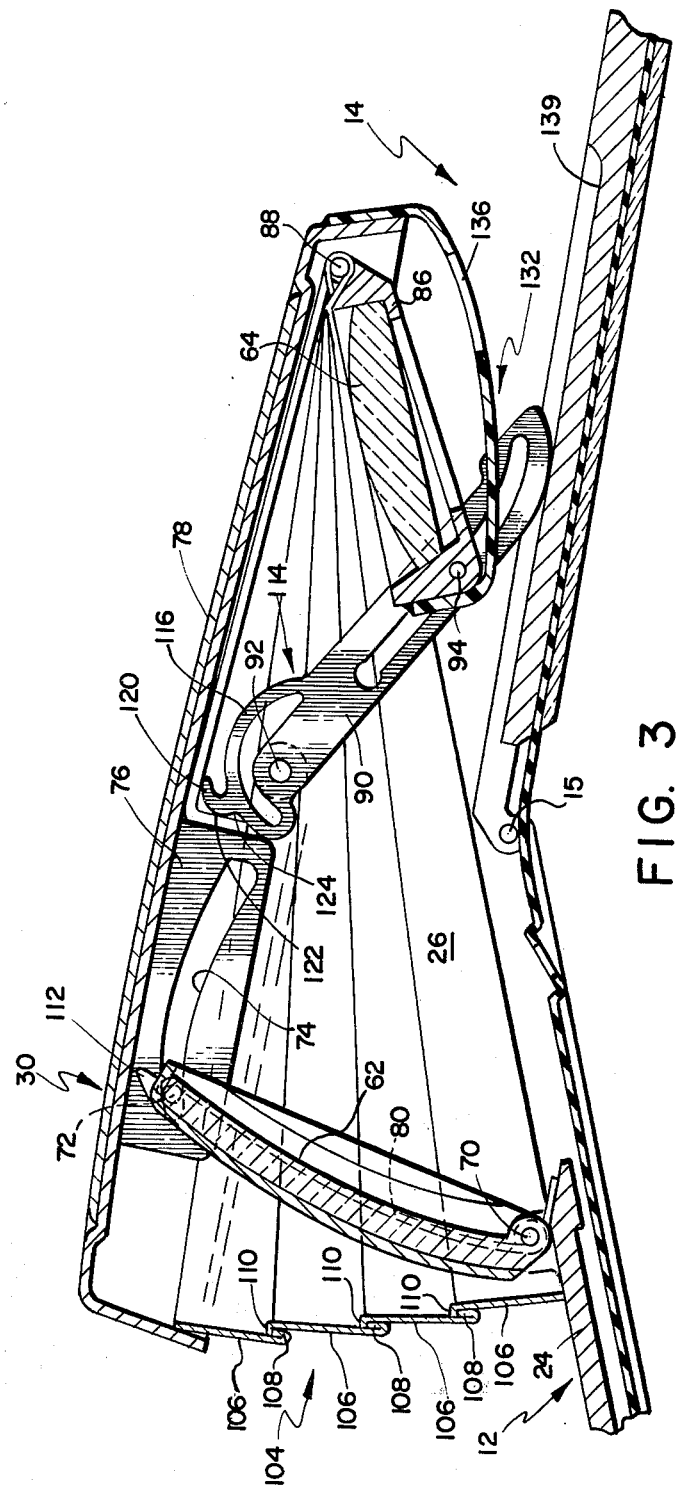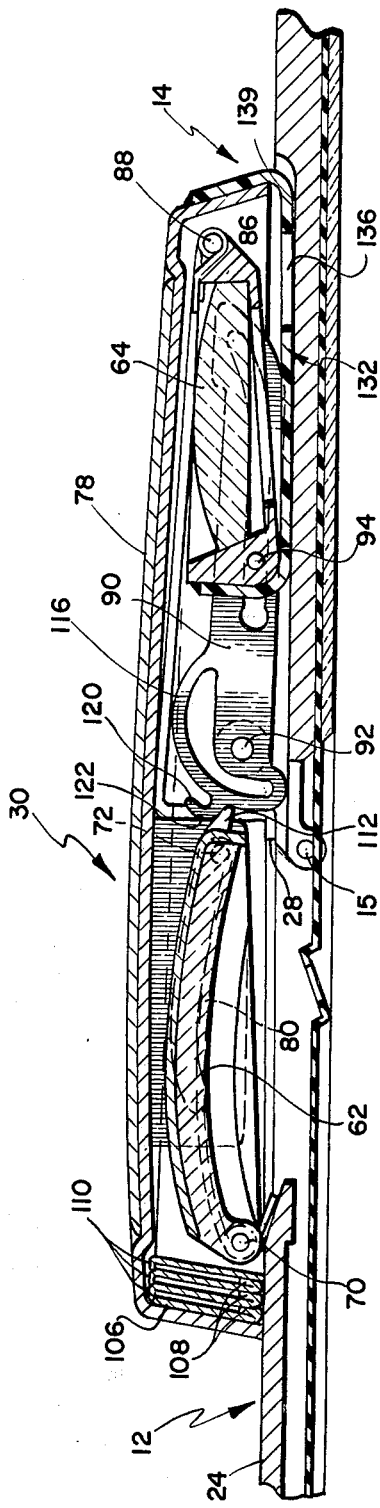

REFLEX CAMERA AND VIEWING DEVICE AND ATTACHMENT THEREFOR

BACKGROUND OF THE INVENTION

The present invention relates generally to reflex photographic cameras and, more particularly, to a viewfinder and attachment therefor.

Certain photographic film materials are structured to directly record a positive image of any subject properly imaged and exposed thereon. Exemplary of such materials are the film units described in U.S. Pat. No. 3,415,644, entitled "Novel Photographic Products and Processes" and issued to E. H. Land on Dec. 10, 1968. Film units of this type are intended for use within self-processing photographic cameras of the reflex type as indicated above and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the unit.

To image properly through a lens system upon the above-described film units, it is necessary that one or an odd number of specular surfaces be incorporated within the optical path extending from the camera lens to the exposure plane of the film unit. Although the film units are configured to provide a desirably large film format, certain improved photographic camera designs have taken advantage of the requisite specular surface to achieve somewhat compact overall camera structures. To achieve an even more compact structure which is still capable of exposing large format, e.g., snapshot-sized photographic materials, the traditional solution would appear to reside in a folding type camera. While compactness has been achieved with such cameras as folded, once erected, the cameras generally prove bulky, unbalanced, and usually difficult and uncomfortable to operate.

The most common design employs a vertical exposure plane positioned adjacent a vertical rear outer wall of the camera housing, an objective lens extending forwardly of the housing to establish a straight line optical path between the lens and the vertical exposure plane, and a viewing device mounted on the housing adjacent the rear outer wall through which the photographer looks to aim the lens at the scene to be photographed.

In use, the photographer usually holds the camera housing with two hands to aim the lens at a subject since most of the camera's weight is concentrated forwardly of the exposure plane, thereby making it difficult to manipulate the focusing mechanism and shutter release button with one or two free fingers. Framing a subject through the viewing device can be a frustrating experience. Frequently, the user cannot place his eye close enough to the viewfinder because the vertical rear wall of the camera housing is incompatible with his facial contours. More often than not, when he finally positions his eye to look through the viewfinder, either his nose, cheek, or forehead bears against the camera housing and he finds it uncomfortable to hold the camera in this position for long periods of time such as while waiting for an uncooperative child to assume an attractive pose. Also, the camera housing tends to block visual and oral communication with the subject, resulting in the photographer having to repeatedly raise and lower the camera to communicate with his subject in preparation for making a photographic exposure.

A recent innovation in the design of folding cameras, namely, the incorporation of folded optical paths into the optical system of the erected camera, has to a large extent eliminated the undesirable characteristics of the traditional folding camera. The folded optical path, in which light passing through the objective lens is reflected within the camera to change its direction, has several advantages. First, since it is not necessary to use a straight line optical path between the lens and the exposure plane, the camera designer is free to place the exposure plane in a horizontal rather than a vertical position. Second, physical spacing between the lens and the exposure plane is no longer equivalent to optical spacing since the optical path may be folded back on itself one or more times, resulting in a camera having a much shorter front-to-rear dimension than the traditional folding camera design.

As indicated in U.S. Pat. No. 3,722,389, there has been developed a compact folding camera incorporating a folded optical path and which includes a viewing device for providing an image of a scene or subject to be photographed. The camera is formed by a plurality of interconnected housing sections, including first and second housing sections, which are coupled for movement between folded and extended positions. The viewing device is mounted on the first housing section and comprises first and second optical means, including first and second optical elements, coupled to the first housing section for movement relative thereto and to one another between inoperative and operative positions. In the inoperative position, the first and second optical elements are folded flat against the first housing section for storage and are movable to the operative position in which they extend outwardly from the first housing section, in optical alignment with one another, thus cooperating to provide an image of a scene or subject to be photographed.

The viewing device further includes means which are responsive to relative movement of the first and second housing sections between the folded and extended positions for moving at least one of the first and second optical elements between its inoperative and operative positions.

As is typical, the user of the camera which is the subject of U.S. Pat. No. 3,722,389, aforesaid, must place his eye proximate the exit pupil of the viewfinder in order to properly view, frame and focus the image of a particular subject at the camera's film plane. Normally, a user would expect to have little difficulty properly positioning his eye with respect to the viewfinder exit pupil, especially where the viewfinder axis lies in substantially the same direction that the camera is aimed at the subject. However, in certain photographic cameras such as illustrated in U.S. Pat. No. 3,722,389 and U.S. Pat. No. 3,710,697, a particularly compact camera structure is provided wherein a collapsible viewfinder assembly is employed having an optical axis generally parallel to the axis of the photographic objective lens assembly of the camera with both the viewfinder axis and the objective lens assembly axis forming an acute angle with respect to the base section of the camera and the film plane. In cameras of this type, it has been found to be difficult for certain operators, especially those wearing vision correcting apparatus, to properly locate and orient their eye at the exit pupil of the viewfinder to achieve proper framing and focusing with respect to a particular subject. It is in response to this difficulty that the present invention was developed.

SUMMARY OF THE INVENTION

The present invention resides in the provision of an eye positioning aid attached to or attachable to the viewfinder of a photographic camera. In certain photographic cameras such as the SX-70 Camera, manufactured by Polaroid Corporation of Cambridge, Massachusetts, and such as are illustrated in U.S. Pat. Nos. 3,710,697 and 3,722,389, aforesaid, the viewfinder assembly is collapsibly secured to the camera housing and includes a cover assembly or cap, one end of which is pivotally secured to an eye lens and housing assembly. The eye lens and housing assembly is adapted to fold up toward the viewfinder cover assembly and thence back to its operative position when the viewfinder is first collapsed and then erected for use.

The eye positioning aid of the present invention comprises an apertured mask having one end portion connected to the eye lens housing remote from the pivotal connection between the eye lens housing and the viewfinder cover assembly and its other end secured to the viewfinder cover assembly proximate said pivotal connection. The apertured mask is made larger than the distance between the pivotal connection of the eye lens housing and cover assembly and the portion of the eye lens housing to which the apertured mask is attached, such that the apertured mask will bow outward of the eye lens when the viewfinder assembly is in its erected condition. The apertured mask is attached to the viewfinder cover assembly a precise distance from its attachment to the eye lens housing so that the excess length of the apertured mask, aforesaid, will be taken up as the viewfinder assembly is collapsed, permitting the flat storage of the apertured mask proximate the eye lens without doubling over or bowing. The flat storage position of the apertured mask permits its subsequent erection to a precise position upon erection of the viewfinder assembly.

The aperture within the apertured mask is generally rectangular and is made slightly larger than the exit pupil of the viewfinder and is precisely positioned so that upon erection of the viewfinder assembly, the aperture will lie slightly closer to the eye lens than the exit pupil and the general plane of the aperture will be perpendicular to the viewfinder axis. The positioning of the aperture slightly closer to the eye lens than the exit pupil is particularly desired as an aid to users wearing vision correcting apparatus, such as spectacles, which cause them to position their eye further back than a person with normal vision while the increased size of the aperture is desirable to prevent restriction of the field of view by the aperture. The positioning of the aperture such that it is generally normal to the viewfinder axis will cause the user to look along the viewfinder axis and the size and the position of the aperture will cause the user to properly position his eye with respect to the viewfinder exit pupil so that he may properly use the camera and viewfinder. The apertured mask may typically be constructed as of Mylar and may be provided with black flocking on its surface to prevent undesired reflection. Additionally, the apertured mask may be removably secured to the viewfinder cover and eye lens housing by a suitable adhesive so that after the user learns to properly position his eye and no longer requires the use of the apertured mask he may remove same.

In view of the foregoing, it is an object of the present invention to provide means for use in conjunction with a photographic camera and viewfinder assembly to enable a user to properly position his eye with respect to the exit pupil and optical axis of the viewfinder.

Another object of the present invention is to provide means for training the user of a photographic camera having a viewfinder assembly to properly position his eye with respect to the exit pupil of the viewfinder and the viewfinder axis.

Still another object of the present invention resides in the provision of an apertured mask detachably secured to the viewfinder of the camera proximate the exit pupil thereof for training the user to properly position his eye with respect to the exit pupil and axis of the viewfinder whereupon the apertured mask may be detached from the viewfinder.

Still a further object of the present invention resides in the provision of an apertured mask removably attachable to a camera viewfinder assembly in such a manner as to aid users wearing vision correcting apparatus to properly position their eyes with respect to the exit pupil and axis of the viewfinder.

A still further object of the present invention resides in the provision of a flexible apertured mask removably attachable to a collapsible viewfinder assembly and adapted to fold flat within the viewfinder assembly and erect to a position whereat its aperture will be proximate the viewfinder exit pupil between the exit pupil and the viewfinder eye lens and will be of a size slightly larger than the exit pupil to train persons wearing vision correcting apparatus to properly use the viewfinder.

It is yet another object of the present invention to provide an anti-reflective, flexible apertured mask removably attachable to a camera viewfinder for aiding the user in properly positioning his eye for framing a subject through the viewfinder and properly focusing the camera with respect thereto.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the subject invention, wherein:

FIG. 2 provides a fragmentary, broken-away side elevation, partly in section, of the camera and viewing device of FIG. 1 shown in their collapsed or storage positions;

FIG. 3 provides a fragmentary, broken-away side elevation of the camera and viewing device of FIG. 1, partly in section, shown in a position intermediate the storage and extended positions;

DETAILED DESCRIPTION OF THE INVENTION

Figure 1:
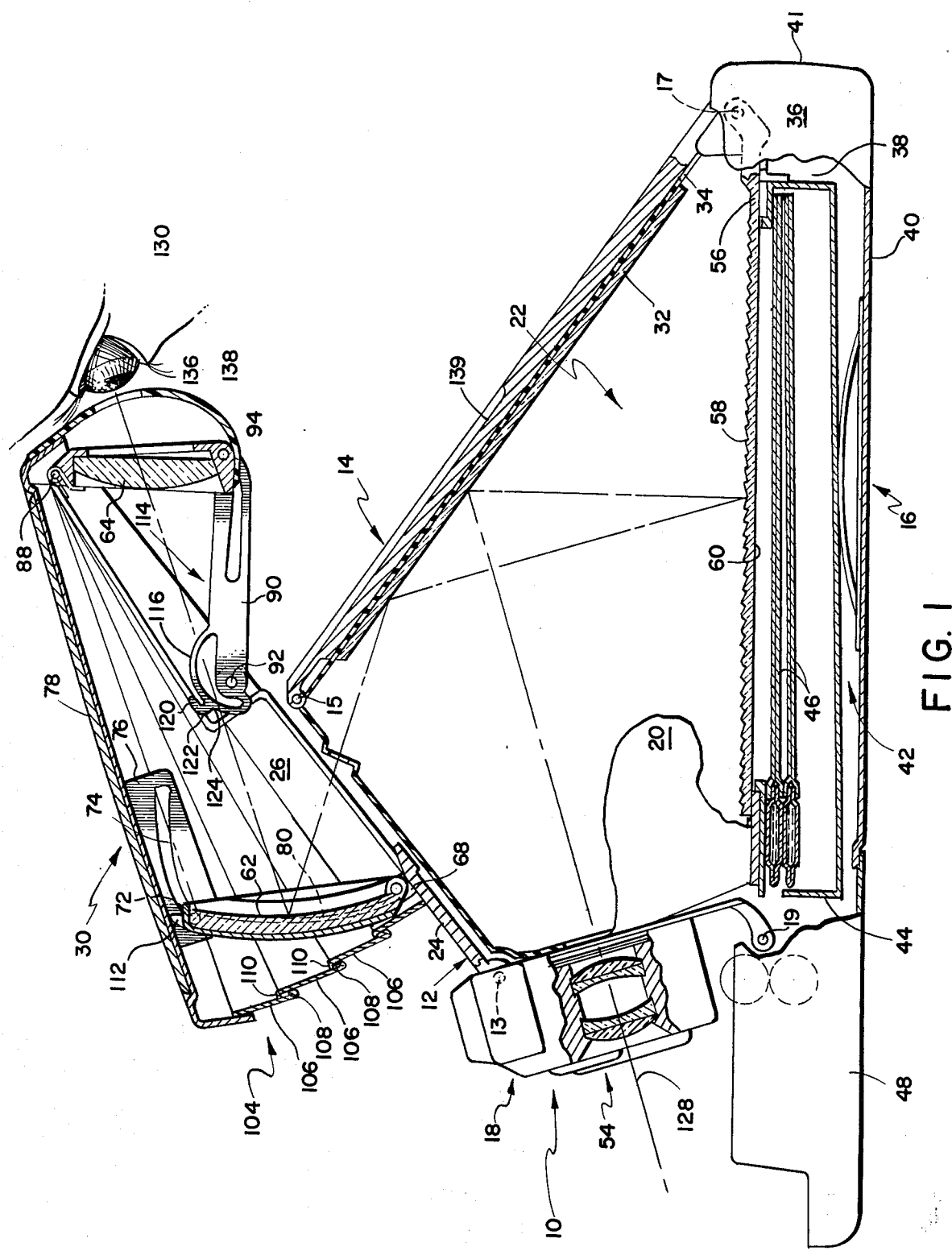
FIG. 1 provides a simplified broken-away side elevation, partly in section, of a camera and viewing device embodying the instant invention and illustrated in their extended or operative positions.

Referring to the drawings in more detail, and more particularly to FIG. 1, a foldable, single lens reflex camera of the self-developing type is illustrated generally in its extended or operative configuration at 10. The camera 10 includes first, second, third, and fourth housing sections 12, 14, 16, and 18, respectively, which are pivotally coupled to each other at 13, 15, 17, and 19 for relative movement between the operative position illustrated in FIG. 1 and the collapsed, storage position illustrated in FIG. 2. The four housing sections, 12, 14, 16, and 18 cooperate with a flexible bellows 20 secured thereto to form a six-sided exposure chamber 22.

The first housing section 12 includes a wall 24 having laterally spaced flanges 26 (only one of which is illustrated) extending upwardly therefrom and an opening 28 which extends into the exposure chamber 22. The flanges 26 provide a means for mounting a viewing device 30 as will be more fully described infra. The second housing section 14, pivotally connected to the first housing section 12 at 15, includes means (not illustrated) for mounting a planar mirror 32 on an interior wall 34 thereof. The third housing section 16 includes a pair of laterally spaced side walls 36 and 38 which are interconnected by a bottom wall 40 and an end wall 41 to define a generally U-shape chamber 42 for receiving a film assemblage including a film container 44 having a plurality of individual film units 46 (only two of which are shown) therein. Extending forwardly of the chamber 42 is a generally U-shape roller support housing 48 having a pair of rollers 50, 52 mounted thereon in closing relation to the open end of the chamber 42. The roller housing 48 is pivotally coupled to the third housing section 16 in a well-known manner and is adapted to be pivoted in a counterclockwise manner to move the rollers 50 and 52 to a position whereat the film container 44 may be inserted into or withdrawn from the chamber 42. Finally, the fourth housing section 18 is pivotally coupled near its ends to housing sections 12 and 16 and is provided with means for mounting a lens and shutter assembly 54 and a shutter release button (not shown).

Pivotally mounted within the exposure chamber 22 is a reflecting means comprising a support 56 having a echelon-type reflecting surface 58 on one side thereof and a planar reflecting surface, e.g., a mirror 60, on the other side thereof. For a more detailed description of the support 56 and the echelon reflecting surface 58, reference may be had to U.S. Pat. Nos. 3,763,756 and 3,735,685, respectively. The reflecting means is adapted to be pivoted between the position shown in FIG. 1 wherein the echelon surface 58 is a component of the camera's viewing system, and a second position wherein the surface 58 is closely adjacent to and parallel with the mirror 32 and the mirror 60 functions as a component of the camera's exposure system.

As best seen in FIG. 1, the viewing device 30 includes first and second optical means 62 and 64, respectively, and it is mounted on the first housing section 12 for movement between the operative position illustrated in FIG. 1 and a collapsed or storage position illustrated in FIG. 2 wherein the optical means 62 and 64 generally lie within the same plane and compliment the compactness of the camera when the latter is in a folded position. The first optical means 62 which is disclosed as a concave mirror is provided with a first erecting means for guiding the concave mirror 62 between the storage and operative positions. The erecting means includes a mirror housing 66 pivotally coupled near its lateral sides by a pin 70 to a pair of tabs 68 (only one of which is shown) extending upwardly from the wall 24; a pair of guide pins 72 (only one of which is shown) extending outwardly from opposite sides of the mirror housing 66 and adapted to be captured in arcuate guides 74 formed in laterally spaced flanges 76 extending downwardly from a cover 78; and biasing means, e.g., a spring 80 having one end 82 in engagement with the wall 24, an intermediate portion wound about the pin 70, and its other end 84 curved about the guide pin 72.

The second optical means, shown as an eye lens 64, is provided with a second erecting means for guiding said eye lens 64 between its operative and storage positions. The second erecting means includes an eye lens housing 86 pivotally coupled about its lateral ends to flanges 26 as by pin means 88; a pair of laterally spaced links 90, each of which has one end pivotally coupled to a flange 26 by a pin 92 and its other end pivotally coupled to a lateral side of the eye lens housing 86 by a pin 94 extending away from the housing 86 and into a slot 96 in the link 90; and a spring having one end portion 98 in engagement with a rib 100 extending inwardly from the flange 26, an intermediate portion wound about the pin 88, and its other end portion 102 in engagement with the eye lens housing 86.

The viewing device 30 is also provided with a collapsible or folding shade 104 for reducing admission of ambient light into the area between the concave mirror 62 and the eye lens 64 to thereby increase the apparent brightness of the image formed by said concave mirror 62. The folding shade 104 is formed by a plurality (four in the embodiment illustrated) of thin, elongated, U-shape blades 106 pivotally coupled near their open ends to the rearwardly extending flanges 26 of the housing section 12 as at the pivot 88. As best seen in FIG. 1, the lowest of the blades 106 is fixedly attached at its closed end to the housing section 12 and is of minimum length, measured from the pivot 88, and each succeeding blade is slightly longer than the one below it. This permits the blades to nest in telescopic fashion as the upper three blades are pivoted downward in counterclockwise direction until their bottom edge bears against the housing section 12. The three uppermost of the blades 106 have inwardly-turned flanges 108 at their closed bottom edges and the three lowermost of the blades 106 have outwardly-turned flanges 110 at their upper closed edges which are adapted to interlock as the three uppermost of the blades 106 are rotated upwardly from the housing section 12 for sequentially erecting the blades to the positions shown in FIG. 1. It should be noted that in the erected position, the individual blades 106 overlap one another, thus preventing ambient light from passing therebetween. The shade 104 is spring-biased toward the erected or light-blocking position by any suitable means, e.g., by a pair of springs. For a more detailed description of the viewing device, reference may be had to U.S. Pat. No. 3,722,389, aforesaid.

The viewing device 30 is provided with latching means for maintaining the optical elements 62 and 64 in their collapsed or storage position, as shown in FIG. 2. The latching means includes a protuberance 112 extending upwardly from the mirror housing 66, as viewed in FIG. 1, and a resilient member 114 which is preferably an integral part of one of the erecting links 90, e.g., the link 90 illustrated in FIG. 1. The resilient member 114 includes an arcuate portion 116, which defines one side of an aperture 118, and an upwardly extending flange 120 having inclined surfaces 122 and 124 on one side thereof.

When the camera and the viewing device are in their folded, storage positions, the various components thereof assume the positions illustrated in FIG. 2. It will be noted that the spring 80 cannot move the concave mirror 62 to its operative position because of the latch effect created by the inclined surface 124 of the flange 120 overlying the protuberance 112 on the mirror housing 66. The flange 120, in turn, is maintained in the position shown due to the link 90 being in engagement with the housing section 14. Accordingly, since the force of the spring 80 is incapable of causing the protuberance 112 to deflect the flange 120 to a position wherein it can clear the inclined surface 124, and since the link 90 is held against clockwise rotation due to its engagement with the housing section 14, the optical elements 62 and 64 are maintained in their collapsed or storage position.

The latching means, of course, is constructed such that the camera 10 and the viewing device 30 may be moved to their erected, operative positions in a plurality of ways and for a more detailed description of the manner in which the viewing device may be moved between erected and storage positions reference may be had to U.S. Pat. No. 3,710,697, aforesaid.

As best seen in FIG. 1, the viewing device 30 is seen to define an optical axis 126 and the lens and shutter assembly 54 of the camera 10 is seen to define an optical axis 128 with the axes 126 and 128 being generally parallel when the viewing device 30 is in the erected position illustrated in FIG. 1.

As best seen in FIG. 1, an observer's eye is shown generally at 130 positioned proximate the exit pupil defined by the viewing device 30. The novel eye positioning device of the subject invention is illustrated generally at 132 and, as best illustrated in FIG. 5, is seen to comprise a generally T-shaped mask 134 having an aperture 136 in its central portion. The mask 134 may typically comprise Mylar or a similar material to provide the requisite flexibility and as best seen in FIGS. 4 and 5 the face of the mask 134 exposed to the observer is provided with an anti-reflective coating or layer to reduce glare, such as the black flocking 138.

Figure 4:
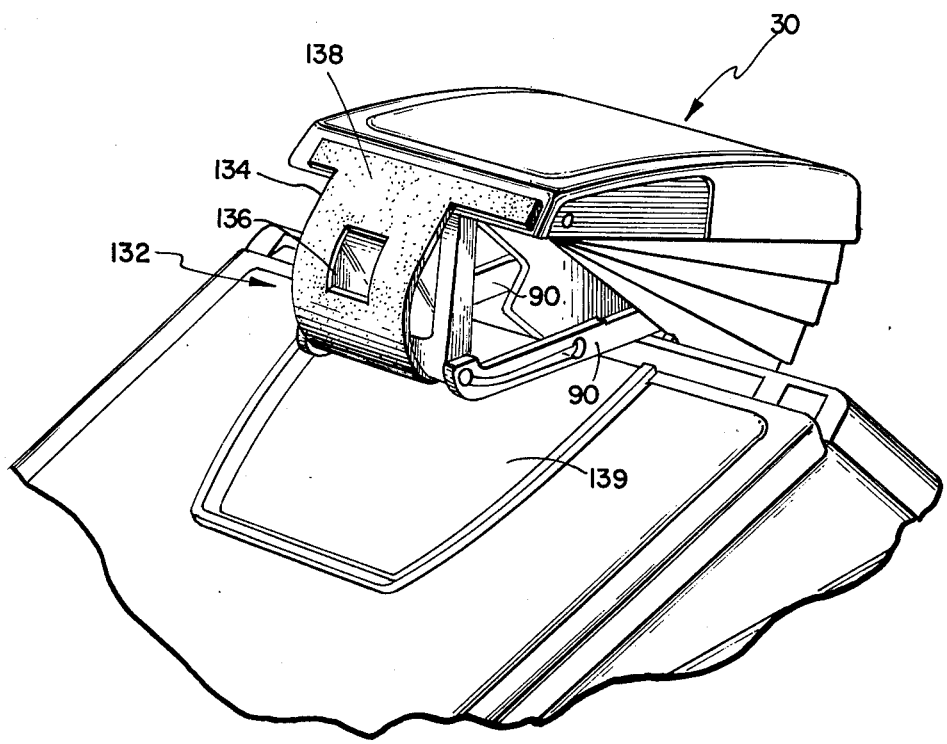
FIG. 4 provides a simplified perspective of a portion of the camera and viewfinder assembly of FIG. 1.
Figure 5:
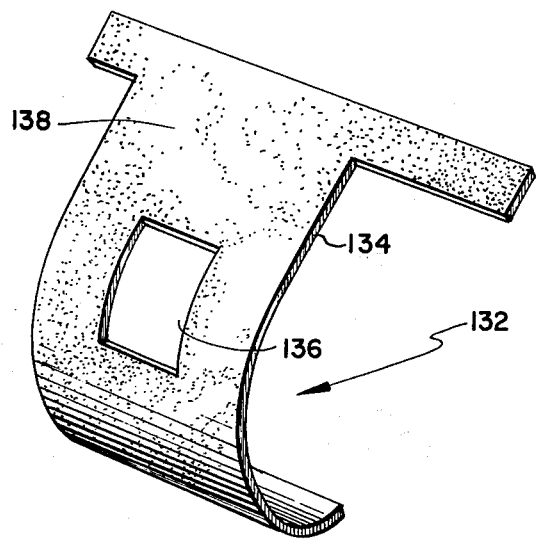
FIG. 5 provides a simplified perspective of the novel apertured mask of the subject invention.

As best seen in FIGS. 1 and 4, the upper edge portion of the mask 134 is secured to the rear edge portion of the cover 78 eccentric of the pivotal connection between the eye lens housing 86 and the cover 78 (i.e., the pin means 88) as by a suitable adhesive and the lower edge portion of the mask 134 is secured to the lower edge of the eye housing 86 proximate the pin means 94 in a similar manner. It should be emphasized that the adhesive for securing the mask 134 is suitably chosen to permit the ready removal of the mask 134 at such time as it may no longer be needed.

As best seen in FIGS. 1 and 4, the mask 134 is constructed of a suitable length so that when fastened to the cover 78 and the eye lens housing 86, as aforesaid, it will bow away from the eye lens 64 toward the observer's eye station at 130 to precisely position the aperture 136 proximate the exit pupil of the viewing device 30 but between the exit pupil and the eye lens 64 to assure that an observer wearing spectacles will not be forced to position his eye beyond the exit pupil. Inasmuch as the aperture 136 will be slightly closer to the eye lens 64 than the exit pupil of the viewing device 30, it is necessary that the aperture 136 be slightly larger than the exit pupil to avoid restricting the field of view of the observer.

As best seen in FIG 1, the aperture 136 is so positioned on the mask 134 that when the viewing device 30 is in the erected position the axis 126 will pass through the center of the aperture 136 perpendicular to the general plane of the aperture 136. Because of the precise size, position, and orientation of the aperture 136, the user of the camera 10 is provided with a ready reference for positioning his eye as at 130 which will not only cause him to position his eye proximate the exit pupil of the viewing device 30, but also to look along the optical axis 126. At such time as the user is thoroughly familiar and comfortable with the use of the viewing device 30, he may no longer require the eye positioning device 132 and at that time he may simply remove the mask 134 should he so desire.

As best illustrated in fIG. 4, the second housing section 14 of the camera 10 is provided with a recess 139 in the surface 24 thereof which, as will be seen infra, aids in the collapse of the viewing device 30 to a compact storage position as is illustrated in FIG. 2. As seen in FIG. 3, when the viewing device 30 is being collapsed from the erect position of FIGS. 1 and 4 to the storage position of FIG. 2, the ends of the links 90 proximate the second optical means (the eye lens) 64 will abut the surface of the recess 139 and the eye lens 64 and its housing 86 will be caused to pivot about the pin means 88 in a clockwise direction in a manner more fully described in U.S. Pat. Nos. 3,710,679 and 3,722,389, aforesaid. It will now be recalled that the upper edge of the mask 134 is secured to the cover 78 eccentric of the pivot 88 and that the lower edge portion of the mask 134 is secured to the lower edge of the eye lens housing 86 such that the distance between the point of attachment of the mask 134 to the housing 86 and the point of attachment between the mask 134 and the cover 78 increases as the viewing device 30 collapses to take up the excess length of the mask 134 permitting the mask 134 and aperture 136 to achieve a generally planar configuration proximate the eye lens housing 86 in the collapsed or storage position illustrated in FIG. 2. Thus, the eye positioning device 132 eye lens housing 86 in the viewing or erected position of FIGS. 1 and 4 is seen to achieve a compact, flat storage position partially received within the recess 139 together with a portion of the viewing device 30. Because the mask 134 is not folded over itself or creased in the storage position, the subsequent erection of the viewing device 30 to the operative position will permit the mask 134 to again bow outward of the eye lens housing 86 to precisely position the aperture 136 as illustrated in FIGS. 1 and 4.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims the instant invention may be practised in a manner otherwise than is specifically described herein.

What is claimed is:

1. A photographic camera and viewing device, including:

means defining an optical axis through said viewing device;
eye lens means connected to said viewing device for forming an image of a subject to be photographed;
means defining an exit pupil outward of said eye lens means; and
means overlying said eye lens means for aiding the positioning of an observer's eye proximate said exit pupil for viewing said subject,
said viewing device being movable between an erected position and a storage position,
said aiding means being movable from a storage position to a predetermined position with respect to said eye lens upon movement of said viewing device to said erected position,
said aiding means comprising a mask provided with an aperture and attached to said viewing device so as to position said aperture between said eye lens means and said exit pupil proximate said exit pupil in said erected position of said viewing device,
said aperture being positioned to generally define a surface normal to said optical axis in said erected position of said viewing device,
said aperture being larger than said exit pupil so as not to restrict the field of view of said observer afforded by said exit pupil,
said mask being removably attached to said viewing device whereby an observer can use same to learn to properly position his eye with respect to the exit pupil and optical axis of said viewing device and thereafter remove said aiding means when it is no longer needed.

2. A photographic camera and viewing device, including:
means defining an optical axis through said viewing device;
eye lens means connected to said viewing device for forming an image of a subject to be photographed;
means defining an exit pupil outward of said eye lens means; and
means overlying said eye lens means for aiding the positioning of an observer's eye proximate said exit pupil for viewing said subject,
said aiding means comprising a mask of flexible sheet material formed with an opening defining an aperture and detachably attached to said viewing device so as to position the region of said mask containing said aperture generally in a surface normal to said optical axis between said eye lens means and said exit pupil proximate said exit pupil.

3. The invention as delineated in claim 2, wherein said flexible mask is provided with an anti-reflective surface remote from said eye lens.

4. In combination with a photographic camera having a base and a viewfinder having an optical axis oblique to said base; said veiwfinder having an eye lens and means defining an exit pupil outward of said eye lens; eye positioning means, including:
a mask of flexible sheet material formed with a rectangular opening defining an aperture of predetermined size; and means for detachably mounting said mask on said viewfinder to precisely locate said aperture between said eye lens and said exit pupil proximate said exit pupil with the region of said mask proximate said opening lying generally in a surface normal to said optical axis whereby a user wearing vision correcting apparatus will be aided in positioning his eye proximate said exit pupil and in sighting along said axis to view a subject.

5. The invention as set forth in claim 4, wherein said mask includes and anti-reflective surface facing said user.

6. In combination with a photographic camera having a base and a viewfinder having an optical axis oblique to said base; said viewfinder having an eye lens and means defining an exit pupil outward of said eye lens, a viewing attachment, including:
means defining an aperture of predetermined size;
means for precisely locating said aperture between said eye lens and said exit pupil proximate said exit pupil; and
means for orienting said aperture generally normal to said optical axis whereby a user wearing vision correcting apparatus will be aided in positioning his eye proximate said exit pupil and in sighting along said axis to view a subject,
wherein said viewing attachment includes an apertured, flexible mask of sheet material removably attached to said viewfinder in overlying relation with said eye lens.

7. The invention as set forth in claim 6, wherein said mask includes an anti-reflective surface facing said user when attached to said viewfinder.

8. An eye positioning training device for attachment to and use with a collapsible viewfinder including a cover assembly pivotally secured at one end to a camera and an eye lens pivotally secured at one end to the cover assembly for erection from a storage position to a viewing position; said training device including a flexible mask of sheet material having an aperture formed therein, means on said mask for removably attaching said mask to said eye lens remote from its pivotal connection and to the cover assembly eccentric of its pivotal connection, said mask being of such a length, exceeding the distance between the pivotal connection of said eye lens and the portion thereof to which said apertured mask is attachable, that when said mask is attached and the viewfinder is erected to its viewing position, said apertured mask will bow outward from the eye lens a predetermined amount to thereby position said aperture essentially in a plane proximate the exit pupil of the viewfinder, and when the viewfinder is collapsed, the excess length of said apertured mask will be taken up and said mask will lie flat and smooth beneath the eye lens and adjacent the camera.

9. The invention as stated in claim 8, wherein said apertured mask is so configured and of such size that said aperture will be positioned proximate the exit pupil between the eye lens and the exit pupil to insure that a user wearing vision correcting apparatus need not position his eye too remote from the exit pupil.

10. The invention as set forth in claim 9, wherein said apertured mask is so configured and of such size as to position said aperture generally normal to the optical axis of the viewfinder when it is erected to its viewing position and said aperture is slightly larger than the exit pupil, whereby the user will be caused to position his eye proximate the exit pupil and sight along the optical axis without said aperture restricting his field of view.

11. The invention as delineated in claim 10, wherein said apertured mask is further provided with a non-reflective surface facing the user when said mask is attached.

* * * * *